(No Model.)
T. HARRIS.
GALVANOMETER.
No. 437,926. Patented Oct. 7, 1890.
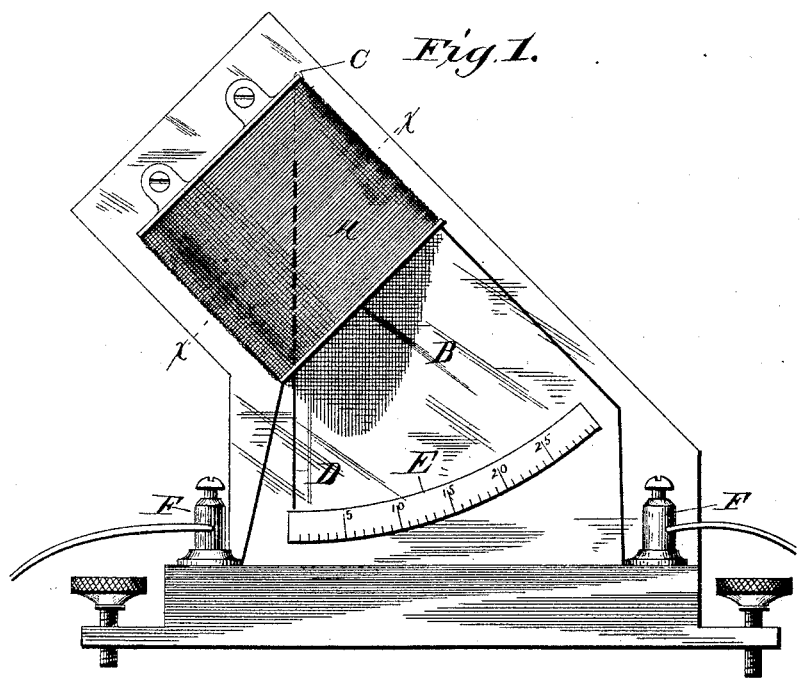
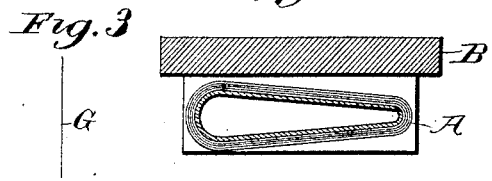

UNITED STATES PATENT OFFICE.

THOMAS HARRIS, OF DETROIT, MICHIGAN, ASSIGNOR OF THREE-FOURTHS TO NATHAN T. THURBER, ALFRED LUCKING, AND HENRY F. DE B. CAMERON, OF SAME PLACE.

GALVANOMETER.

SPECIFICATION forming part of Letters Patent No. 437,926, dated October 7, 1890.

Application filed January 24, 1890. Serial No. 337,958. (No model.)

*To all whom it may concern:*

Be it known that I, THOMAS HARRIS, a subject of the Queen of Great Britain, residing at Detroit, in the county of Wayne and State of Michigan, have invented certain new and useful Improvements in Instruments for Measuring Electric Currents, of which the following is a specification, reference being had therein to the accompanying drawings.

This invention relates to new and useful improvements in devices for measuring electric currents; and the invention consists in the peculiar construction and arrangement of parts, all as more fully hereinafter described, and shown in the accompanying drawings, in which—

Figure 1 is an elevation of a device arranged in accordance with my invention. Fig. 2 is a cross-section thereof on line $x\,x$ in Fig. 1, and Fig. 3 is a detached elevation of the pointer or index.

A is a solenoid provided with a hollow spool, preferably of brass or other suitable metal, and substantially of the wedge-shaped cross-section shown in Fig. 2. This is secured in a vertical plane to a standard B in such a manner that the winding is inclined to the horizontal, the drawing showing it at an angle of about forty-five degrees.

Within the spool is suspended from a suitable point of suspension C a magnetic filament D, and below the spool is a graduated arc, which indicates electrical units, and the zero-point of which coincides with the perpendicular position of the magnetic filament when it is affected by gravity alone.

F are the binding-posts to which the terminals of the solenoid are secured, and which form the means of connecting the device with the terminals of the electric source to be measured.

The magnetic filament is of soft iron, and preferably suspended by a filament G, of silk or other material, to which its upper end is attached, while its lower end is extended by a filament I, of aluminium, cane, fiber, or other light and non-magnetic material, and forming a suitable pointer to give accurate readings.

The instrument is supported on a suitable base, which is preferably supported on adjusting-screws to permit of adjusting the instrument properly.

In practice, the parts being arranged as described and shown, the instrument is so adjusted that the magnetic filament points to zero on the scale and that it hangs free to move in a vertical plane coincident with the central plane of the spool. The instrument is now ready for use by connecting the electrical source to be measured with the binding-posts F, so as to cause the current to be measured to flow through the solenoid. It will be seen that whenever a current passes through the solenoid it must necessarily render the iron filament D magnetic, even on the passage of a very feeble current, as the flattened form of the spool concentrates the electric field in which the filament is suspended. At the same time, as the direction of the electric current in passing through the solenoid is not at right angles to the normal position of the magnetic filament, the latter, in accordance with the law of Oersted, tends to move into such position. This tendency, owing to the manner of suspending the filament, produces a deflection of the same from its normal position. The counteracting force, which prevents the filament from being deflected until it stands at right angles to the direction of the current, is the force of gravitation which tends to draw it back to the perpendicular. Thus between the two forces which act upon the filament the latter will be deflected more or less, according to the strength of the current. Thus with a suitable division on the scale the absolute or relative strength of different currents may be ascertained in units or degrees on the scale. In connecting the binding-posts to the electrical source to be measured the current flows through the solenoid and forms an electrical field in which the pointer is free to move. Now it will be seen that as the current traverses the solenoid at an angle of about forty-five degrees to the soft-iron section H of the pointer the latter in becoming magnetized will act in the same manner as the magnetic needle in Oersted's law—that is, it moves in a direction which will bring it at right angles to the direction of the currents. Owing to its manner of suspension it will thereby impart a movement to the whole pointer around the point of suspension. At the same time this movement carries it into the contracted portion of the solenoid, where its distance from the current is reduced and the magnetic force thereby considerably increased. Thus while the pointer is moved out of the perpendicular position the force with which it is deflected or moved out of such position constantly increases, and may thus be made to form an offset to the increased force of gravity, which tends to return the pointer to normal. Thus it will be seen that with the proper proportions of the parts described the division on the scale which may represent any desired unit of measurement—such as ampères, volts, &c—can be made of practically-uniform sizes, thus giving for larger currents the same exact measurement as for smaller currents, which with the present measuring-instruments is not obtained.

The object of making the spool of the wedge-shaped cross-section shown is to increase the effective strength of the electric field with the angle of deflection of the filament, for if this were not done it is obvious that the rapidly-increasing ratio with which the gravity resists the deflection of the filament would make the instrument less and less sensitive with the increase in the angle of deflection when larger currents have to be measured, and if the scale were graduated to indicate units the divisions on the scale would become gradually smaller and smaller the farther they are from the zero-point. By deflecting the filament into an electrical field which increases the more it is deflected a compensating force is created, which increases the amplitude of deflection in any desired ratio, according to the degree or form of contraction of the spool and an instrument of this kind may thus be constructed in which the divisions of the scale are uniform for like values from the zero-point to the highest point of measurement for which the particular instrument is adapted.

It will be seen that by making the filament substantially as described it is extremely light and sensitive, and by suspending it from the higher corner of the spool with the solenoid so secured that the filament when at zero will hang diagonally across the spool, or nearly so, the largest sweep for the filament is obtained.

The number of windings and kind of wire or conductor depends upon the kind of currents to be measured, and as a matter of common knowledge need not be particularly described.

For the convenience of reading the scale the solenoid is so inclined that the filament has to move to the right, and it will be seen that it is immaterial in which direction it is traversed by the current to be measured.

In measuring-instruments of this kind it is an important feature that it should readily respond to any variation of current and without taking time by oscillating to and fro and thus making it difficult to obtain an exact reading. This I have accomplished by using a very light needle of magnetic filament, which becomes highly saturated when between the metal plates forming the spool, and as it is well known that currents are set up which retard the motion producing them the filament will act with a dead beat.

The spirit of my invention consists in constructing a measuring-instrument in which the indications are a direct resultant of the well-known action of the magnetic needle toward electrical currents and of the gravity of the needle itself, and this is accomplished by means of a needle suspended on end.

What I claim as my invention is—

1. In an electrical measuring-instrument, the combination, with a coil, of a vertically-deflecting needle or filament suspended by a flexible thread, substantially as described.

2. In an electrical measuring-instrument, a vertically-deflecting needle or filament consisting of a magnetic section, a flexible thread by means of which it is vertically suspended, and a non-flexible lower extension of light and non-magnetic material, substantially as described.

3. In an electrical measuring-instrument, the combination of a solenoid secured in a vertical plane with its winding at an angle to the horizontal and a vertically-deflecting needle or filament suspended therein on end by a flexible cord, substantially as described.

4. In an electrical measuring-instrument, the combination of an inclined wedge-shaped solenoid and a magnetic filament vertically suspended therein, substantially as described.

5. In an electrical measuring-instrument, the combination of an inclined solenoid wound upon a wedge-shaped spool and a vertically-deflecting needle or filament suspended therein, substantially as described.

6. The combination of a solenoid wound upon a wedge-shaped spool and secured at an incline in a vertical plane and a deflecting needle or filament suspended therein and consisting of a soft-iron filament and a flexible thread secured thereto at one end and by means of which it is suspended, substantially as described.

7. In an electrical measuring-instrument, the combination of the solenoid secured in a vertical plane at an incline, the wedge-shaped spool of metal upon which said solenoid is wound, a deflecting-filament suspended within said spool and consisting of a flexible thread, a magnetic or soft-iron portion secured to said thread, and a non-magnetic light extension forming a pointer at the lower end, substantially as described.

In testimony whereof I affix my signature, in presence of two witnesses, this 10th day of January, 1890.

THOMAS HARRIS.

Witnesses:
M. B. O'DOGHERTY,
GEO. O. GREGG.